United States Patent [19]

Bachmann

[11] 4,348,503

[45] Sep. 7, 1982

[54] ADHESIVE COMPOSITION

[76] Inventor: Andrew G. Bachmann, Burlington Rd., Harwinton, Conn. 06791

[21] Appl. No.: 156,475

[22] Filed: Jun. 4, 1980

[51] Int. Cl.$^3$ .................. C08L 75/12; C05L 75/04
[52] U.S. Cl. .................. 525/455; 525/163; 525/454; 525/920
[58] Field of Search .............. 525/455, 920, 454, 153

[56] References Cited

U.S. PATENT DOCUMENTS

| | | | |
|---|---|---|---|
| 3,616,040 | 10/1971 | Toback | 156/310 |
| 3,890,407 | 6/1975 | Briggs | 260/878 R |
| 4,129,641 | 12/1978 | Fernanini | 525/455 |
| 4,208,495 | 6/1980 | Chang | 525/435 |
| 4,221,840 | 9/1980 | Alvino | 525/920 |
| 4,232,133 | 11/1980 | Fernanini | 525/455 |
| 4,242,415 | 12/1980 | Feltzin | 525/455 |
| 4,299,942 | 11/1981 | Piestert | 525/455 |

FOREIGN PATENT DOCUMENTS 2319459 11/1974 France .
1132821 11/1968 United Kingdom .

Primary Examiner—Paul Lieberman

[57] ABSTRACT

An adhesive composition, capable of functioning either aerobically or anaerobically, includes an acrylate monomer and a suitable elastomeric filler, together with an aromatic perester catalyst and a dibasic acid capable of cyclic tautomerism.

14 Claims, No Drawings

ADHESIVE COMPOSITION

BACKGROUND OF THE INVENTION

Although many different types of adhesives are presently commercially available, and are found to be entirely satisfactory for their intended purposes, the demand remains for adhesive formulations capable of developing high levels of strength in brief periods of time and under a wide variety of conditions. A difficulty commonly encountered in producing certain types of fast-acting adhesives relates to the tendency for such products to cure prematurely; i.e., to have an undesirably short or unpredictable shelf-life. Thus, it is important that such a material be stable against reaction until such time as it is applied to the workpiece, and to thereupon cure quickly to produce the desired levels of bond strength. Moreover, the applicability of an adhesive to effect bonding of a wide variety of diverse materials is of obvious advantage in maximizing its utility, and hence its value in the marketplace.

While commercially available anaerobic acrylate adhesives are capable of developing excellent levels of tensile and impact strength after relatively short cure times, their use is limited, as a practical matter, to the bonding of nonporous surfaces such as of metal, glass, and the like, due to the need to exclude oxygen from the reaction situs. The same characteristic also limits the utility of anaerobic adhesives for gap filling applications, due to the tendency for oxygen to migrate to portions of the adhesive residing within gaps of more than a certain minimum spacing, thereby precluding the development of bond strength by maintaining the cure reaction reversible. Furthermore, if the gap is too wide, the adhesive will often drip upon elements that are not to be bonded, or that must be kept free from foreign substances, thus producing undesirable or, indeed, intolerable consequences. Finally, the presently available anaerobic adhesives have a tendency to harden prematurely, even in the absence of any activator and despite measures to maintain an oxygen-containing atmosphere, which obviously is highly undesirable.

Accordingly, it is a primary object of the present invention to provide a novel adhesive formulation that is capable of producing high levels of bond strength in very brief cure times, and to do so under conditions that are either aerobic or anaerobic.

It is also an object of the invention to provide a method for effecting the adhesive bonding of either porous or nonporous elements in brief curing periods and under either aerobic or anaerobic conditions.

Another object of the invention is to provide such a novel composition based upon ingredients that are conventional, readily available, and not unduly expensive, and which does not set up prematurely.

SUMMARY OF THE DISCLOSURE

It has now been found that certain of the foregoing and related objects of the invention are readily attained in a nonanaerobic adhesive composition comprising the combination of an adhesive and a latent catalyst system, wherein the adhesive includes about 40 to 90 parts per hundred of an acrylic ester monomer capable of free-radical polymerization and about 60 to 10 parts per hundred of an elastomeric filler compatible with the monomer to produce, upon polymerization thereof, an adhesive solid. The catalyst system of the composition comprises, in amounts based upon the weight of the adhesive, about 1 to 10 parts per hundred of an aromatic perester free-radical precursor, about 0.5 to 10 parts per hundred of a dibasic organic acid capable to cyclic tautomerism, and up to about 500 parts per million of a soluble compound of a transition metal cure accelerator; the composition is free from any organic hydroperoxide catalyst.

In preferred embodiments of the composition, the perester catalyst is reactive with amine/aldehyde adduct activators to generate free radicals, and it will advantageously be one selected from the group consisting of t-butyl perbenzoate, di-t-butyl diperphthalate and 2,5-dimethyl-2,5-bis(benzoylperoxy)hexane. The dibasic acid will generally be selected from the group consisting of maleic, malic, salicylic, itaconic and phthalic acids, and mixtures thereof, and a particularly desirable specific composition utilizes t-butyl perbenzoate as the perester catalyst and maleic acid as the dibasic acid component. Most desirably, the compositions of the invention will additionally include at least 50 parts per million of the transition metal compound, especially suitable among which are the compounds of iron, copper, cobalt, manganese, tin, titanium, chromium and antimony; preferably, the compound will provide the metal in an oxidized valence state.

The acrylic ester monomer utilized in the composition desirably includes a reactive hydroxyl group, and a particularly preferred acrylic ester monomer comprises hydroxyethyl methacrylate. Most desirably, the composition additionally includes, as a portion of the monomer ingredient, a minor proportion of a polyacrylate ester, such as tetraethyleneglycol dimethacrylate. The filler is advantageously a urethane polymer, which may desirably be a prepolymer having pendant groups that are reactive with the acrylic ester monomer; specifically, the prepolymer may be a monomeric polyacrylate ester having terminal acrylate radicals linked by at least two divalent polyurethane or polyureide groups. In especially preferred compositions, the adhesive is comprised of about 50 to 80 parts per hundred of the monomer and about 50 to 20 parts per hundred of the filler, and the amount of dibasic organic acid is at least about 1.0 part per hundred, based upon the weight of the adhesive.

Other objects of the invention are attained in a method for the adhesive bonding of two surfaces, wherein an adhesive composition, as previously described, is applied to at least one of the surfaces to be bonded. Contact of the coated surface with a second surface to be bonded thereto is effected, the perester catalyst is activated to generate free radicals, and contact between the surfaces is maintained for a period of time and under such conditions as to effect curing of the adhesive composition. The method may preferably be one in which an amine/aldehyde adduct activator is employed, in which case the adduct is applied to the second surface to be bonded. In certain embodiments of the method, conditions of contact include the presence of oxygen between the confronting surfaces, and the method may be particularly beneficially employed in instances in which the surfaces are separated by a gap in excess of about 15 mils. As used herein, references to contact between surfaces does not, of course, mean direct contact, since the surfaces will actually be separated from one another with the adhesive composition residing therebetween.

DETAILED DESCRIPTION OF THE PREFERRED EMBODIMENTS

As indicated hereinabove, the compositions to which the present invention is directed comprise the combination of an adhesive and a catalyst system, the latter being particularly unique in nature. Specifically, the catalyst system is based essentially upon an aromatic perester free radical precursor, that will generally be capable of activation by an amine/aldehyde adduct (or condensation product) activator. A second essential component of the catalyst system is a dibasic organic acid capable of cyclic tautomerism, and the system also desirably (but not essentially) includes a transition metal cure accelerator.

The aromatic perester catalyst is typified by t-butyl perbenzoate, although other aromatic peresters having catalytic properties and suitable for use herein are known and will be evident to those skilled in the art. For example, other benzoic acid perester derivatives, as well as peresters derived from phthalic acid, chlorobenzoic acid, and the like, may be suitable; specific examples have previously been provided. In general, the amount of catalyst used will be about 1 to 10, and preferably about 2 to 5, parts per hundred (pph), based upon the total weight of the adhesive portion (i.e., the combined weight of monomer and filler) of the composition.

The catalysts employed will normally be reactive with certain commercially available amine/aldehyde adducts to produce the free radicals necessary to initiate polymerization of the monomers of the adhesive formulation. Typical of such adducts are the rubber vulcanization accelerators sold by the R. T. Vanderbuilt Company under the trade designations VANAX 808 and VANAX 833; VANAX 808 is a buteraldehyde/analine adduct, and VANAX 833 is a buteraldehyde/butylamine adduct. The same products are available from E. I. DuPont de Nemours & Co. under the "808" and "833" designations, and a product based upon the 833 adduct, but containing a small amount of copper salt, is sold by Loctite Corporation under the designation LOCTITE NF. (However, the Loctite material will not generally be used with the instant compositions because of the general preference for incorporating the metal activator in the adhesive formulation, rather than adding it at the time of use, as will be discussed more fully hereinbelow.)

It will be appreciated that the amount of the amine-/aldehyde activator employed is not critical, and will generally simply be that which is provided by coating therewith one of the surfaces to be bonded. Of course, there should be a sufficient concentration of the activator to react with all of the catalyst present in the adhesive, and to ensure migration throughout the adhesive mass in a relatively short period of time and, in any event, before a surface layer of the adhesive hardens and thereby prevents further migration of the activator, and consequential incomplete curing. Typically, the activator will be employed in a volumetric ratio of about 1:4 to the adhesive formulation.

Although the preferred embodiments of the invention rely upon the use of a chemical activator of the sort hereinabove described, curing may be effected simply by heating the composition to a temperature sufficiently high to generate the necessary free radicals from the perester catalyst. The temperatures utilized for thermal activation will usually be in the range of about 80° to 150°, and preferably about 95° to 120°, Centigrade. The cure rate will, of course, vary according to the temperature of reaction, with values of 15 minutes to about one hour being typical. As will be appreciated from the date hereinafter set forth, such times are considerably slower than those that are achieved utilizing the amine/aldehyde adduct chemical activators; thus, from that standpoint, thermal curing will usually represent the less desirable alternative. The need to subject the parts to be bonded to elevated temperatures may also be a disadvantage, both as a matter of convenience and also because of possible deleterious effects of heat upon the workpiece.

As indicated, the second essential ingredient in the catalyst system is a dibasic organic acid capable of cyclic tautomerism; thus, for example, maleic, malic, salicylic, itaconic and phthalic acids are suitable. Although such acids may be used in combination with one another, and indeed with other adhesion promoting organic acids such as acrylic acid, maleic acid, by itself, produces very desirable results. Generally, the concentration of the dibasic acid in the formulation will be about 0.5 to 5.0 pph, based upon the weight of the adhesive portion. Although as much as 10% with certain acids such as salicylic may be used, the preferred concentration is about 0.75 to 3.0 pph, and the most desirable range is about 1.0 to 1.5 pph.

It is a most notable feature of the present invention that the specified dibasic acids perform two important functions in the adhesive formulations. Firstly, they dramatically increase the rate of cure; for example, whereas a formulation containing 1.5 pph of maleic acid is capable of curing to fixture (i.e., self-supporting) strength in approximately 45 seconds, a formulation which differs only in the omission of the maleic acid will attain the same level of strength only after a cure period of about eight minutes. It is found that no significant enhancement of the cure rate by the dibasic acid is afforded at concentrations lower than about 0.5 pph, and that the most satisfactory cure rates will generally be achieved if the concentration is at least 0.75 pph or higher. On the other hand, little benefit is obtained by using amounts of the dibasic acid greater than about 5 pph, and brittleness can occur if the concentration is too high; the preferred maximum is 3 pph.

The second function of the dibasic acid is to enhance ultimate bond strength. Although it is known that other organic acids (such as acrylic acid) significantly increase the impact and tensile strength of acrylate adhesives, such other acids are not seen to provide the advantageous cure rate increases that are realized with the dibasic, cyclicly tautomeric acids disclosed for use herein.

It should be noted that acrylic acid is widely used with the conventional anaerobic acrylate-based adhesives. As a matter of definition, curing of such compositions must not, of course, occur to any significant extent in the presence of oxygen; hence, any additive that increases the tendency for curing of an anaerobic adhesive in the presence of oxygen (or, conversely, reduces oxygen curing inhibition) is undesirable. The dibasic organic acids used in the present compositions do, in fact, significantly diminish oxygen curing inhibition in acrylate adhesives, and therefore are not suitable for use in conventional formulations intended only for anaerobic application. In contrast, the present adhesives cure under both aerobic and also anaerobic conditions (i.e., they are "nonanaerobic") and they therefore utilize to great advantage the unique characteristics of the dibasic acids described.

EXAMPLE ONE

Indicative of the ability of the maleic acid-type compounds to enhance curing, regardless of whether or not oxygen is present, are tests in which glass slides are bonded with a formulation exemplifying the invention and containing varying amounts of maleic acid. (As used herein, and in subsequent specific Examples, all amounts stated are on a weight basis.)

A formulation containing (exclusive of the dibasic acid) 60 parts of hydroxyethyl methacrylate (HEMA), 40 parts of a HEMA-capped urethane prepolymer (CASTOMER 0002), 4 parts of t-butyl perbenzoate (TBPB) and 50 ppm, based on the adhesive portion, of ferric sulfate, is spread upon the surface of one glass slide and is contacted, under pressure, with a second glass slide to which an appropriate amount of the VANAX 808 amine/aldehyde adduct curing agent has been applied; the adhesive formulation is utilized in a ratio of about 4:1 to the activator. The pressure applied is such as to extrude a narrow (i.e., about ¼-inch) fillet about the periphery of the slides, with the area of compression being approximately one square inch. By determining the time (at room temperature) that it takes for the adhesive to cure sufficiently to inhibit relative sliding movement under finger pressure, and also the time that is required for hardening of the fillet, the anaerobic and aerobic curing properties, respectively, of the adhesive are both evaluated.

In this manner, it is found that the above composition of the invention, containing 1.5 pph of maleic acid, produces a sliding fixture time (as stated hereinbefore) of 45 seconds and a fillet curing time of two minutes; comparable results are achieved with 1.0 pph of the acid. At a concentration of 0.75 pph, however, the fixture time increases to 55 seconds, and no substantial curing is detected in the fillet after 15 minutes. Further reductions of maleic acid content to 0.5, 0.375 and zero pph cause the fixture times to increase to about 2¾, 5 and 8 minutes, respectively, without of course producing any curing of the fillet. An anaerobic adhesive commercially available from Loctite Corporation (LOCTITE 317) also produces no fillet cure after 15 minutes; this is, of course, to be expected due to the oxygen environment in which the fillet exists.

In regard to the transition metal accelerator that is optionally included in the catalyst system of the instant compositions, it is a further unique feature of the formulations of the invention that they can contain such a metal in an effective amount without setting up, or gelling, prematurely. Ions of iron, copper, manganese, and the like are well known cure accelerators for anaerobic acrylate adhesives; however, they are invariably furnished thereto from the activator (e.g., in admixture with the amine/aldehyde adduct), which is not combined with the adhesive and catalyst components until the formulation is actually used. Direct incorporation of the metals will cause anaerobic adhesives to cure despite the presence of oxygen, and hence they cannot be employed therewith in that manner.

As indicated, the same is not so of the present formulations, and notable advantages are realized as a result. Because the metal activator can be included with the adhesive and catalyst system without causing premature curing, it can be dispersed homogeneously therethroughout; hence, upon initiation of the reaction (by either chemical or thermal activation) the metal will be immediately accessible to all reactive portions of the composition, thereby promoting uniform and complete curing. This feature is especially valuable in adapting the present compositions for use in applications in which the surfaces to be bonded are spaced more than a minimum distance from one another. Thus, while the anaerobic adhesives will not generally cure satisfactorily within gaps of more than about 15 to 20 mils, the formulations of the invention may be used in gaps on the order of 100 mils in width. Indeed, a controlling factor relates to surface curing, and the consequential inhibition of migration of the amine/aldehyde accelerator throughout the adhesive mass; consequently, when curing is effected thermally even wider gaps may be filled with suitably formulated compositions embodying the invention. It is also found that the inclusion of the transition metal makes the product more reliable and easier to use, by minimizing the possibility of inadequate bond strength development through failure to strictly adhere to prescribed practices.

When used, the metal will normally be incorporated in very small quantities, and typically in amounts of about 50 to 500 ppm based upon the total weight of the adhesive portion. While the amount of metal generally will not exceed about 100 ppm, there may in fact be instances in which concentrations even higher than 500 ppm may be beneficial. For example, should one wish to formulate a composition using monomers that are especially slow to polymerize, relatively large quantities of the metal activator may be used as a compensating measure.

The transition metal may be introduced as any appropriate soluble salt or organic compound, typical of which are ferric sulfate, cupric octate, manganic sulfate, ferrocene, and the like; additional alternatives will be evident to those skilled in the art. Although not a critical factor, it will generally be preferable to introduce the metal in an oxidized valence state, because the reduced forms are found to have a somewhat greater tendency to induce premature hardening.

In final regard to the catalyst system, and as has been noted hereinabove, it is essential to the proper functioning of the present formulations that there be included therein no substantial amount of catalytic hydroperoxide. The presence of such a material will render the compositions essentially anaerobic in nature, as would thereby frustrate primary objectives of the invention. While it is theoretically possible for peresters to hydrolyze to corresponding hydroperoxides, the present formulations obviously do not provide conditions that are conducive to hydrolysis.

The acrylate monomers will, of course, constitute the principal reactants of the formulation, and they will generally be the reaction products of acrylic and/or methacrylic acids with one or more mono- or polybasic, substituted or unsubstituted, alkyl ($C_1$ to $C_{18}$), aryl or aralkyl alcohols. Preferred acrylates will often be those in which the alcohol moiety contains a polar substituent (e.g., an hydroxyl, amine, hologen, cyano, heterocyclic or cyclohexyl group), since crosslinking or other intermolecular bonding is promoted thereby, and this is especially so when reactive fillers are employed, as will be discussed hereinafter. General disclosures of suitable acrylic ester monomers are provided in the prior art, such as in U.S. Pat. Nos. 3,218,305 (line 65, column 1 through line 47, column 2); 3,425,988 (line 49, column 2 through line 21, column 3); 3,651,036 (line 69, column 1 through line 12, column 2); 3,658,624 (line 74, column 1 through line 58, column 2); 3,826,756 (line 49, column 2 through line 5, column 3); and 3,855,040 (line 20, column 3 through line 55, column 4), which portions of the foregoing specifications are hereby incorporated by reference into this specification. From the foregoing, it is believed that the choice of appropriate ester monomers will be evident to those skilled in the art, and that further generalized description thereof will therefore be unnecessary.

In more specific terms, however, a preferred monomer is the above-mentioned HEMA, because of the very desirable properties that it produces in the adhesives, and also because of its ready availability and relatively low cost. It is most advantageous to utilize in combination therewith a copolymerizable polyacrylate monomer such as tetraethyleneglycol dimethacrylate (TEGMA), which functions as an effective cross-linking agent, thereby maximizing toughness and strength in the ultimate, fully cured adhesive. Such a comonomer may be employed in any effective amount, but generally its concentration will range from about 1 to 10 percent, based upon the weight of the principal acrylate monomer (of course, the total amount of monomer utilized may in some instances be provided by such a compound). Typical of the acrylates that may be employed, in addition to those already mentioned, are the tetraethyleneglycol, isodecyl and hydroxyethyl esters of acrylic acid; the butyl, isodecyl, methyl, tetrahydrofurfuryl, isobornyl, and dicyclopentadienyl esters of methacrylic acid; diacrylates, triacrylates and tetracrylates (i.e., the polyacrylic and polymethacrylic esters) of butyleneglycol, tetraethyleneglycol, polyethylene glycol 600, bisphenol A, pentaerythritol (particularly the triacrylate ester), and the like.

Each of the specific acrylates and methacrylates mentioned hereinabove is reactive in a formulation of the sort disclosed, regardless of whether or not any cyclicly tautomeric dibasic acid is included. However, (assuming adequate solubility), the inclusion of such an acid invariably produces a significant reduction in the curing time of the adhesive, and in certain cases the decrease is quite dramatic. Thus, in a composition such as that of Example One, and in the absence of any dibasic acid, the room temperature, anaerobic curing fixture times range from about 5 to 20 minutes; the incorporation of 1.5 weight percent of maleic acid reduces those times to about 1.5 to 5 minutes, in the most notable instances.

Turning now more specifically to the filler, virtually any elastomeric material that is soluble (to at least a significant degree) in the monomer fraction, and that serves to toughen and/or strengthen the cured adhesive, may be used. The filler need not, of course, be introduced as a rubbery solid; liquids and waxy substances are also entirely suitable. However, as mentioned above it is most desirable that the elastomeric filler be reactive with the monomeric components, to produce intermolecular bonding, since that will enhance compatibility and tend to maximize the ultimate properties of the adhesive.

Although the selection of specific appropriate elastomeric fillers will be evident to those skilled in the art, it might be mentioned that typical suitable materials include vinyl polymers, acrylic polymers, polyester elastomers, glycol polymers, natural and synthetic rubbers, and the like. More particularly, fillers such as VINAC B-7 (polyvinyl acetate sold by Airco Chemical Company), polyethyleneglycol 6000, HYCAR CTBN and HYCAR 1022 (liquid rubbers sold by the B. F. Goodrich Chemical Company), X-80 (polyester oligomer sold by Union Carbide Corporation), and KM-229, KM-288 and KM-323B (acrylic elastomers sold by the Rohm & Haas Company) are advantageously used in the formulations of the invention. In certain instances, the urethane polymers and prepolymers will be preferred, with the latter being especially desirable due to the potential that they afford for further reaction of their pendant isocyanate groups with a reactive functionality (e.g., an hydroxyl group) provided by a suitable acrylate monomer. Typical specific urethane elastomers that are advantageously used include the rubber sold by B. F. Goodrich Chemical Company under the trade designation ESTANE 5730, and the prepolymers sold respectively by Witco Chemical Company and by N. L. Industries under the designations CASTOMER 0002 (previously referred to) and VORITE. Particularly preferred are such urethanes "capped" with an acrylic monomer, such as the polyacrylate esters of organic polyisocyanates described as "monomers" in the above U.S. Pat. No. 3,425,988 (the portion of the disclosure thereof in column 2, line 35 through column 4, line 58 is hereby incorporated hereinto by reference). In view of all of the foregoing, however, it will be appreciated that the selection of a particular elastomeric filler is not critical, and that the specific material used may vary widely, depending upon the application for, and the properties desired in, the adhesive.

The amount of filler may also vary within fairly broad limits, but it will generally constitute about 10 to 60, and preferably 20 to 50, weight percent of the total adhesive portion of the composition. In any particular case the amount will depend upon several factors, including again the properties desired in the ultimate product, the nature of the monomeric and elastomeric components employed, and the like.

In addition to the principal components hereinabove described, it will be evident that other materials may also be incorporated into the instant compositions. For example, it is conventional to include in acrylate adhesive formulations certain "inert" fillers, such as wood flour, glass fibers, cotton linters, mica, alumina, silica, and the like, to modify viscosity, improve impact resistance, and for other purposes; such fillers may also be included in these adhesives. It is also conventional to include small percentages of silane monomers to increase moisture resistance, as well as to enhance bonding of the adhesive to glass and similar surfaces; although the present adhesives exhibit good moisture resistance, it may nevertheless be desirable to include such a silane monomer. Other substances, such as dyes, fire retarders, stabilizers (e.g., the quinones and hydroquinones), thixotropes, thickeners, plasticizers, antioxidants, and the like, may additionally be included, although it will be appreciated that such additives will often be furnished in the principal ingredients, making their separate introduction unnecessary.

In further illustration of the efficacy of the formulations of the invention are the following additional specific examples.

EXAMPLE TWO

Adhesive systems are formulated by admixing 80 parts of a monomer mixture, containing HEMA and TEGMA in a 9:1 ratio, with 20 parts of ESTANE 5730 polyurethane rubber, 500 ppm of quinone, 3 pph of TBPB, either zero or 500 ppm of ferric sulfate, and various amounts of acrylic acid or maleic acid. Curing times to fixture strength under anaerobic conditions are determined using glass slides, as hereinbefore described, and fixture times under aerobic conditions are determined using wood blocks; DuPont 808 amine/aldehyde accelerator is employed in all instances by wiping the product onto one of the surfaces to be bonded. The stability (shelf life) of each formulation is also evaluated, by maintaining it at 82° Centigrade until setting up occurs or until a period of 30 minutes elapses, whichever takes place first; the absence of curing for a period of ten minutes or longer under those conditions is indicative of a shelf life of at least one year at room temperature. The results are set forth below in Table One, with fixture times and stability being expressed in minutes:

TABLE ONE

| Acid | % | Iron | Fixture Time Anaerobic | Aerobic | Stability |
|---|---|---|---|---|---|
| Acrylic | 2 | no | 4+ | 10+ | 30+ |
|  | 5 | no | 4+ | 10+ | 30+ |
|  | 10 | no | 3.5 | 10+ | 30+ |
|  | 10 | yes | 3 | 10+ | 15 |
| Maleic | 0 | no | 4+ | 10+ | 30+ |
|  | 2 | no | 1 | 1 | 30+ |
|  | 0 | yes | 2+ | 3+ | 30+ |
|  | 2 | yes | ¾ | ¾ | 30+ |

The foregoing Table demonstrates the effectiveness of the maleic acid, in comparison with the acrylic acid, in producing aerobic curing and in producing quick curing under both aerobic and also anaerobic conditions. The synergistic effect of the combined ferric ion, in reducing cure times to 45 seconds, is shown, and its tendency to render anaerobic adhesives (represented by the acrylic acid formulations) unstable is also indicated. Results similar to the foregoing are obtained when cupric octate, manganic sulfate and ferrocene are each substituted in the same concentration for the ferric sulfate.

EXAMPLE THREE

A formulation embodying the invention is prepared as in the foregoing Example, but with 4 pph of TBPB, 1.5 percent of maleic acid, and 50 ppm of ferric sulfate. It is tested in comparison with LOCTITE 317 anaerobic adhesive (both being fully cured, where possible), using the DuPont 808 adduct as the activator (at room temperature) in some instances, and effecting thermal curing (at 93° Centigrade for one hour) in others. The results are set forth below in Table Two:

TABLE TWO

|  | Inventive Adhesive | No. 317 |
|---|---|---|
| LAPSHEAR - heat cure (psi) | 3000 | 3200 |
| LAPSHEAR - DuPont 808 (psi) | 2800 | 2800 |
| IMPACT - heat cure | 5 | 3 |
| IMPACT - DuPont 808 | 5 | — |
| T-PEEL - heat cure (pli) | 10 | 12 |
| Cure Through Volume (mils) | 50 | 15-20 |

Impact is determined by butt bonding the ends of 1×1×2-inch pieces of maple stock, securing one end of the assembly, and striking the other end manually with a hammer; the number of blows necessary to produce failure of the bond are set forth (the absence of a value for chemical activator curing of the No. 317 adhesive is indicative of its anaerobic nature). Lapshear and T-Peel strengths are determined using 1×4-inch cold rolled steel and in accordance with ASTM D1002, and using etched aluminum strips and in accordance with ASTM 1876, respectively; the units are, of course, pounds per square inch (psi) and pounds per linear inch (pli). The "cure through volume" data are obtained using the adduct activator and glass slides, and indicate the maximum gap separation within which curing is effective.

EXAMPLE FOUR

Utilizing various amounts of different dibasic, cyclicly tautomeric acids in a formulation similar to that of Example One, but in which 10 pph (based upon the monomer mixture) of VINAC B-7 polyvinyl acetate is substituted for the filler used therein, fixture times on glass and wood, and the attainment of fillet curing, are determined (adduct activation is with DuPont 808). Results similar to those exhibited (i.e., nonanaerobic curing) using maleic acid are obtained with a malic/acrylic acid mixture, salicylic acid, itaconic acid and phthalic (i.e., o-phthalic) acid. Acrylic, acetic, benzoic, succinic, oxalic, malonic, sulfuric and terephthalic (i.e., p-phthalic) acids, and saccharin, produce formulations that are essentially anaerobic in nature. Tests to determine tensile strength also indicate that the effects of the other tautomeric acids are comparable to those of maleic.

EXAMPLE FIVE

An adhesive is prepared by admixing 60 parts of HEMA, 40 parts of HEMA-capped CASTOMER 0002 urethane prepolymer, 4 parts TBPB, 50 ppm of ferric sulfate, and 0.5 part of maleic acid. Upon activation with VANAX 833 adduct, fixture curing (anaerobic) occurs in 4 to 6 minutes; the cured adhesive exhibits excellent flexibility and fatigue resistance, a lapshear tensile strength of about 2000 psi, and a T-Peel strength of about 20 pli. Increasing the maleic acid concentration to 1.5 percent significantly reduces the fixture time, increases the bond strength, and decreases flexibility somewhat. Increasing the maleic acid content even more, to 3 percent, while adjusting the monomer/filler ratio to 50:50, results in a formulation that cures in a period of about 10 seconds, and exhibits lapshear and tensile strengths of about 2000 psi and 8 to 10 pli, respectively.

Thus, it can be seen that the present invention provides novel adhesive formulations that are capable of producing high levels of bond strength in very brief periods of cure time, and under conditions that may be either aerobic or anaerobic. The cured adhesives are water resistant, and exhibit tensile strengths of about 1000 to 5000 psi; curing can be effected in periods of one minute or less; and premature hardening is minimized. Indeed, formulations of the invention applied to the threads of a nut and bolt assembly show no signs of curing, at room temperature and in the absence of any activator, for extended periods of time. For example, the formulation of Example One, so used, does not cure anaerobically, for at least 72 hours under such conditions. The compositions are suited for use with both porous and also nonporous workpieces, and they are based upon ingredients that are conventional, readily available and not unduly expensive. Novel methods of adhesive bonding are also provided, which methods are highly effective to quickly produce bonds of excellent strength, under a wide variety of conditions.

To avoid possible misunderstanding, perhaps it should be pointed out that the term "cyclic tautomerism", as used herein, refers to that capability of the dibasic acid to theoretically exist in a state in which a bond or pseudo bond is formed between the carboxylic moieties of the acid, to produce an isomer in which those moities are in a ring-like configuration, in equilibrium with a non-cyclic isomer.

Having thus described the invention, what is claimed is:

1. As a nonanaerobic adhesive composition, the combination of an adhesive and a latent catalyst system, said adhesive comprising:
   a. about 40 to 90 parts per hundred of an acrylic ester monomer capable of free-radical polymerization, and
   b. about 60 to 10 parts per hundred of a monomeric polyacrylate ester prepolymer having terminal acrylate radicals linked by at least two divalent polyurethane or polyureide groups, said acrylic ester monomer and polyacrylate ester prepolymer producing, upon polymerization thereof, an adhesive solid;
said catalyst system comprising, in amounts based upon the weight of said adhesive:
   c. about 1 to 10 parts per hundred of an aromatic perester free-radical precursor,
   d. about 0.5 to 10 parts per hundred of an organic acid capable of cyclic tautomerism, and
   e. up to about 500 parts per million of a soluble compound of a transition metal cure accelerator;
said composition being free from any organic hydroperoxide catalyst.

2. The composition of claim 1 wherein said perester catalyst is reactive with amine/aldehyde adduct activators to generate free radicals.

3. The composition of claim 1 wherein said perester catalyst is selected from the group consisting of t-butyl perbenzoate, di-t-butyl diperphthalate and 2,5-dimethyl-2,5-bis(benzoylperoxy)hexane.

4. The composition of claim 1 wherein said acid is selected from the group consisting of maleic, malic, salicylic, itaconic and phthalic acids, and mixtures thereof.

5. The composition of claim 2 wherein said perester catalyst is t-butyl perbenzoate and said acid is maleic.

6. The composition of claim 1 additionally including at least 50 parts per million of said transition metal compound.

7. The composition of claim 6 wherein said metal is selected from the class consisting of iron, copper, cobalt, manganese, tin, titanium, chromium and antimony.

8. The composition of claim 7 wherein said metal is in an oxidized valence state.

9. The composition of claim 1 wherein said acrylic ester monomer includes a reactive hydroxyl group.

10. The composition of claim 9 wherein said acrylic ester monomer comprises hydroxyethyl methacrylate.

11. The composition of claim 9 additionally including, as said acrylic ester monomer, a minor proportion of a polyacrylate ester.

12. The composition of claim 1 wherein said adhesive comprises about 50 to 80 parts per hundred of said monomer and about 50 to 20 parts per hundred of said filler, and wherein the amount of said organic acid is at least about 1.0 part per hundred of said adhesive.

13. As a nonanaerobic adhesive composition adapted for curing with an amine/aldehyde adduct activator, the combination of an adhesive and a latent catalyst system, said adhesive comprising:
   a. about 40 to 90 parts per hundred of an acrylic ester monomer capable of free-radical polymerization, and
   b. about 60 to 10 parts per hundred of a monomeric polyacrylate ester prepolymer having terminal acrylate radicals linked by at least two divalent polyurethane or polyureide groups, said acrylic ester monomer and polyacrylate ester prepolymer producing, upon polymerization thereof, an adhesive solid;
said catalyst system comprising, in amounts based upon the weight of said adhesive:
   c. about 1 to 10 parts per hundred of an aromatic perester free-radical precursor which is activatable by reaction with an amine/aldehyde adduct activator;
   d. about 0.5 to 10 parts per hundred of an organic acid selected from the group consisting of maleic, malic, salicylic, itaconic and phthalic acids, and mixtures thereof, and
   e. about 50 to 500 parts per million of a soluble compound of a transition metal cure accelerator;
said composition being free from any organic hydroperoxide catalyst.

14. The composition of claim 13 wherein said perester catalyst is selected from the group consisting of t-butyl perbenzoate, di-t-butyl diperphthalate and 2,5-dimethyl-2,5-bis(benzoylperoxide)hexane.

* * * * *

UNITED STATES PATENT AND TRADEMARK OFFICE
CERTIFICATE OF CORRECTION

PATENT NO. : 4,348,503
DATED : September 7, 1982
INVENTOR(S) : Andrew G. Bachmann It is certified that error appears in the above—identified patent and that said Letters Patent is hereby corrected as shown below:

Column 9, line 24 (Table One) the numerals "1" and "30+" should be under the table headings "Aerobic" and "Stability", respectively.

Signed and Sealed this

Third Day of May 1983

[SEAL]

Attest:

Attesting Officer

GERALD J. MOSSINGHOFF

Commissioner of Patents and Trademarks